United States Patent
Nudejima et al.

(10) Patent No.: US 12,169,565 B2
(45) Date of Patent: Dec. 17, 2024

(54) CIRCUIT ENABLING DEVICE, NON-TRANSITORY COMPUTER READABLE MEDIUM, AND USER-SPECIFIC CIRCUIT

(71) Applicant: FUJIFILM Business Innovation Corp., Tokyo (JP)

(72) Inventors: Masaki Nudejima, Kanagawa (JP); Takayuki Hashimoto, Kanagawa (JP); Daiki Takazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 325 days.

(21) Appl. No.: 17/700,533

(22) Filed: Mar. 22, 2022

(65) Prior Publication Data
US 2023/0084475 A1 Mar. 16, 2023

(30) Foreign Application Priority Data
Sep. 10, 2021 (JP) ................. 2021-148166

(51) Int. Cl.
G06F 21/57 (2013.01)
G06F 8/41 (2018.01)
G06F 9/30 (2018.01)
G06F 9/32 (2018.01)
G06F 15/78 (2006.01)
G06F 21/51 (2013.01)

(52) U.S. Cl.
CPC ............ *G06F 21/572* (2013.01); *G06F 8/434* (2013.01); *G06F 9/30101* (2013.01); *G06F 9/30105* (2013.01); *G06F 9/321* (2013.01); *G06F 9/324* (2013.01); *G06F 15/7867* (2013.01); *G06F 21/51* (2013.01)

(58) Field of Classification Search
CPC ........ G06F 21/572; G06F 8/434; G06F 8/443; G06F 15/7867
See application file for complete search history.

(56) References Cited

U.S. PATENT DOCUMENTS

2008/0115118 A1* 5/2008 Bartucca ................. G06F 8/434
717/140
2020/0410102 A1* 12/2020 Miller ................... G06F 21/572

FOREIGN PATENT DOCUMENTS

| JP | 2006018577 | | 1/2006 | |
| JP | 2008042936 A | * | 2/2008 | ......... G06F 15/7867 |
| JP | 2009123051 | | 6/2009 | |

* cited by examiner

*Primary Examiner* — Kyung H Shin
(74) *Attorney, Agent, or Firm* — JCIPRNET (57) ABSTRACT

A circuit enabling device includes a processor configured to, when multiple predetermined setting values are written in a register in predetermined order, enable a module corresponding to the multiple predetermined setting values and the predetermined order, the multiple predetermined setting values being determined in advance for each of a multiple modules, the register being used to enable the multiple modules individually, the multiple modules being included in a user-specific circuit, the user-specific circuit including a general-purpose circuit and a user circuit, the user circuit including the multiple modules.

10 Claims, 5 Drawing Sheets

| WRITING ORDER | MODULE A | MODULE B | MODULE C |
|---|---|---|---|
| 1 | SETTING VALUE 1 FOR A | SETTING VALUE 1 FOR B | SETTING VALUE 1 FOR C |
| 2 | SETTING VALUE 2 FOR A | SETTING VALUE 2 FOR B | SETTING VALUE 2 FOR C |
| : | : | : | : |
| N | SETTING VALUE N FOR A | SETTING VALUE N FOR B | SETTING VALUE N FOR C |

CIRCUIT ENABLING DEVICE, NON-TRANSITORY COMPUTER READABLE MEDIUM, AND USER-SPECIFIC CIRCUIT

CROSS-REFERENCE TO RELATED APPLICATIONS

This application is based on and claims priority under 35 USC 119 from Japanese Patent Application No. 2021-148166 filed Sep. 10, 2021.

BACKGROUND

(i) Technical Field

The present disclosure relates to a circuit enabling device, a non-transitory computer readable medium, and a user-specific circuit.

(ii) Related Art

Japanese Unexamined Patent Application Publication No. 2006-18577 discloses a method of preventing the configuration of a circuit from being specified. In the method, a gate circuit, which controls access to an internal logic from an external circuit, is included in a field programmable gate array. A permission key, which is set in an internal permission-key setting register in advance, is compared with a permission key, which is received from the external circuit. When the keys match each other, the gate circuit is unlocked to permit access to the internal logic from the external circuit.

Japanese Unexamined Patent Application Publication No. 2009-123051 discloses a semiconductor integrated circuit. The semiconductor integrated circuit includes a functional module, an external-access prohibited register group, an external-access permitted register group, and a copy controller. The functional module performs various data processing. The external-access prohibited register group has multiple registers in which register values referred to by the functional module are set. Access to the external-access prohibited register group from the outside is prohibited. The external-access permitted register group has registers corresponding to the registers in the external-access prohibited register group. Register values are set to external-access permitted register group from the outside. The copy controller copies the register values, which are set in the external-access permitted register group, to the external-access prohibited register group in response to a copy instruction from the outside. However, when the copy instruction is transmitted in a period other than a given period in which copying is allowed, the copy controller performs a copy restriction process of prohibiting the copy operation.

SUMMARY

Aspects of non-limiting embodiments of the present disclosure relate to a circuit enabling device, a non-transitory computer readable medium, and a user-specific circuit which enable multiple modules in the user-specific circuit to be enabled individually. The user-specific circuit includes a general-purpose circuit and a user circuit which includes the multiple modules.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a circuit enabling device comprising: a processor configured to, when a plurality of predetermined setting values are written in a register in predetermined order, enable a module corresponding to the plurality of predetermined setting values and the predetermined order, the plurality of predetermined setting values being determined in advance for each of a plurality of modules, the register being used to enable the plurality of modules individually, the plurality of modules being included in a user-specific circuit, the user-specific circuit including a general-purpose circuit and a user circuit, the user circuit including the plurality of modules.

BRIEF DESCRIPTION OF THE DRAWINGS

Exemplary embodiment of the present disclosure will be described in detail based on the following figures, wherein.

DETAILED DESCRIPTION

By referring to the drawings, an exemplary embodiment of the present disclosure will be described in detail below.

Figure 1:
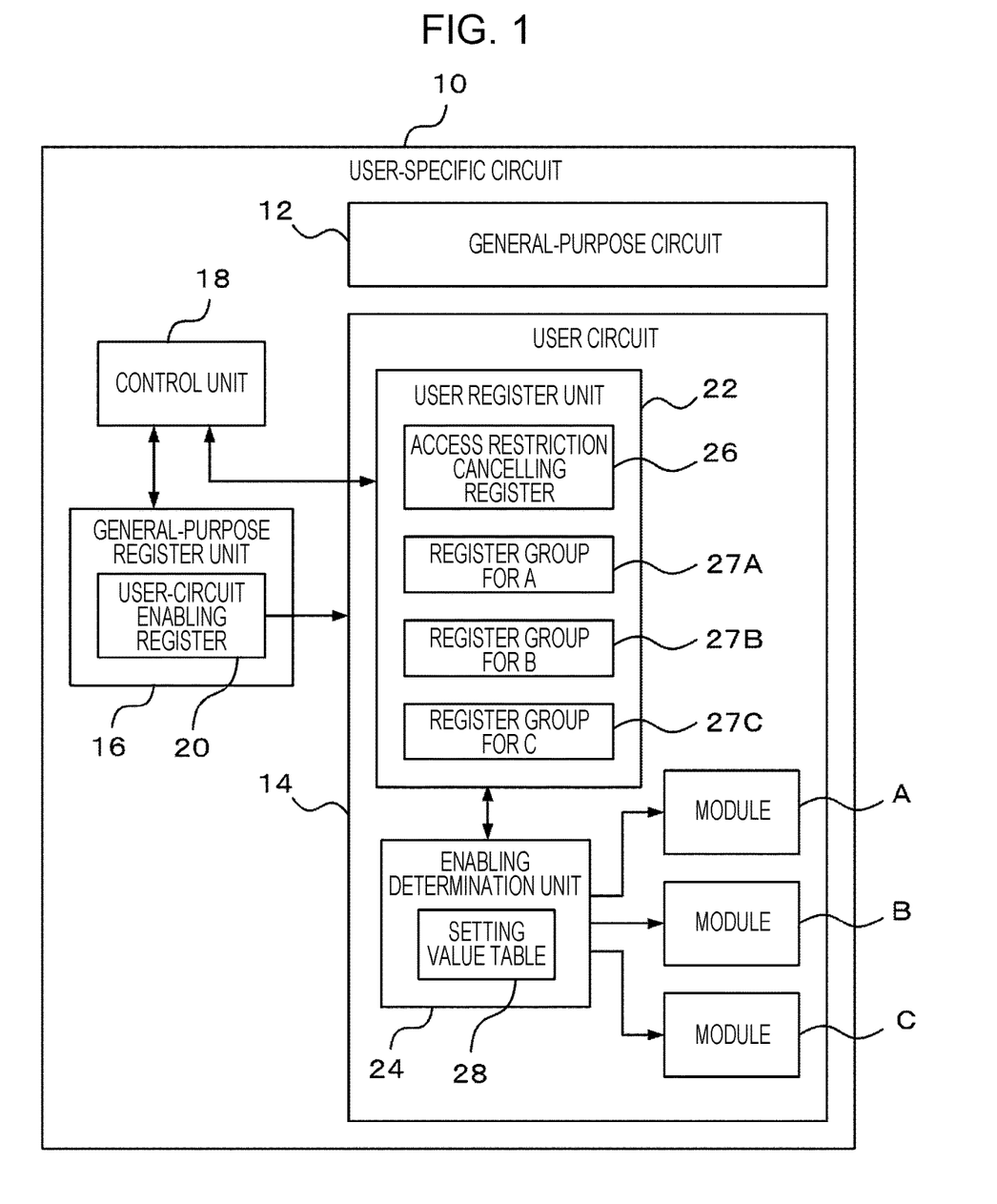
FIG. 1 is a diagram illustrating the configuration of a user-specific circuit.

FIG. 1 illustrates the configuration of a user-specific circuit 10. The user-specific circuit 10 includes a general-purpose circuit 12, a user circuit 14, a general-purpose register unit 16, and a control unit 18.

The general-purpose circuit 12 is available to the public, and may be used by various users without restriction.

The user circuit 14 is not available to the public, and may be enabled by specific users for use.

The general-purpose register unit 16 includes a user-circuit enabling register 20.

When the control unit 18 receives, from an external apparatus, an instruction to enable the user circuit 14, the control unit 18 writes a predetermined unlock key in the user-circuit enabling register 20. The user circuit 14 is enabled by the unlock key written in the user-circuit enabling register 20. That is, the control unit 18 is allowed to control the user circuit 14. Enabling a user circuit indicates that access to the user circuit is permitted.

The user circuit 14 includes multiple modules A, B, and C, a user register unit 22, and an enabling determination unit 24. The example in FIG. 1 illustrates three modules. However, the number of modules is not limited to this, and may be two or may be four or greater. The enabling determination unit 24 is an exemplary circuit enabling device.

The modules A to C are circuits for partial functions obtained by segmenting a function provided by the user circuit 14. For example, if the function provided by the user circuit 14 is the optical character reader (OCR) function, the module A is, for example, a circuit for implementing a function of removing noise from an image. The module B is a circuit for implementing a function of correcting the tilt of an image from which noise has been removed by the module A. The module C is a circuit for implementing a function of extracting characters from the image whose tilt has been corrected by the module B. The function provided by the user circuit 14 is not limited to the OCR function.

The user register unit 22 includes an access restriction cancelling register 26, which is a register for enabling the modules A, B, and C individually, a register group 27A for the module A, a register group 27B for the module B, and a register group 27C for the module C.

Figure 2:
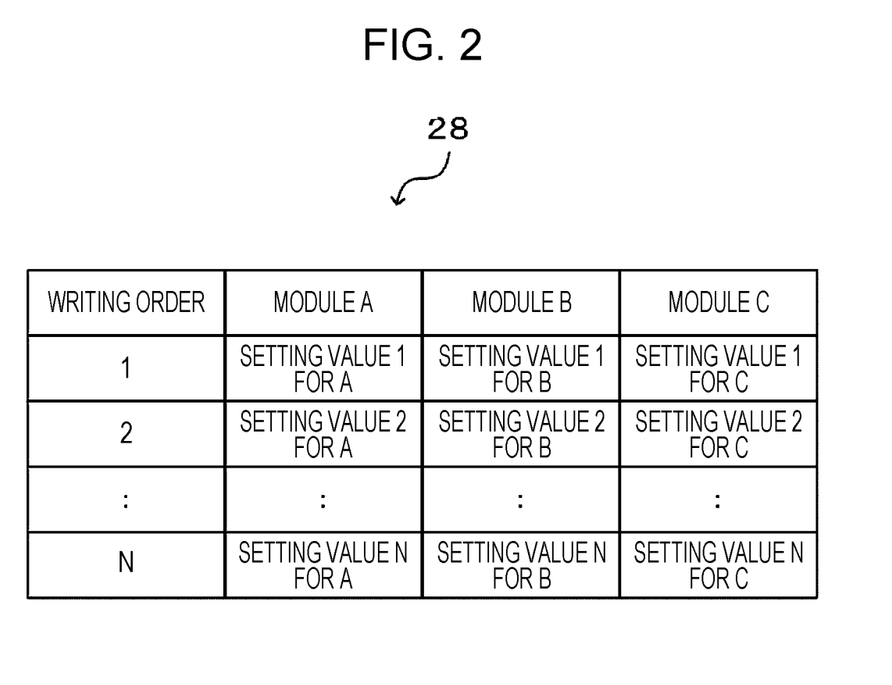
FIG. 2 is a diagram illustrating an exemplary setting value table.

The enabling determination unit 24 stores a setting value table 28. As illustrated in FIG. 2, in the setting value table 28, the correspondence between the writing order of setting values to the access restriction cancelling register 26, and predetermined setting values, whose number is equal to N (N≥2), for each of the modules A, B, and C is set. The N setting values are different from each other. However, the setting values may include the same values.

When the predetermined setting values for each of the modules A, B, and C, that is, the N setting values, are written in the access restriction cancelling register 26 in the predetermined order, the enabling determination unit 24 enables the module corresponding to the predetermined setting values and the predetermined order. That is, when setting values are written in the access restriction cancelling register 26 successively, the enabling determination unit 24 refers to the setting value table 28. When the setting value table 28 has a module which matches the writing order and the setting values, the enabling determination unit 24 enables the module. When the setting value table 28 does not have a module which matches the writing order and the setting values, the enabling determination unit 24 does not enable modules. For example, when N=3, three setting values along with their writing order are set for each module in the setting value table 28. In this case, for example, when the module A is to be enabled, setting value 1 for A, setting value 2 for A, and setting value 3 for A need to be written in this sequence in the access restriction cancelling register 26.

Herein, enabling a module refers to permission of access to the module and the register group for the module. For a module which is not enabled, the register group for the module is not allowed to be accessed. Thus, the module is not allowed to be used. For example, when the module A is not enabled, the register group 27A is not allowed to be accessed. For example, even if a try to write data in the register group 27A is made, the writing is ignored. Thus, the register group 27A is not allowed to be accessed. When a try to read data from the register group 27A is made, the register group 27A is not allowed to be accessed, for example, by returning meaningless values such as random numbers.

Figure 3:
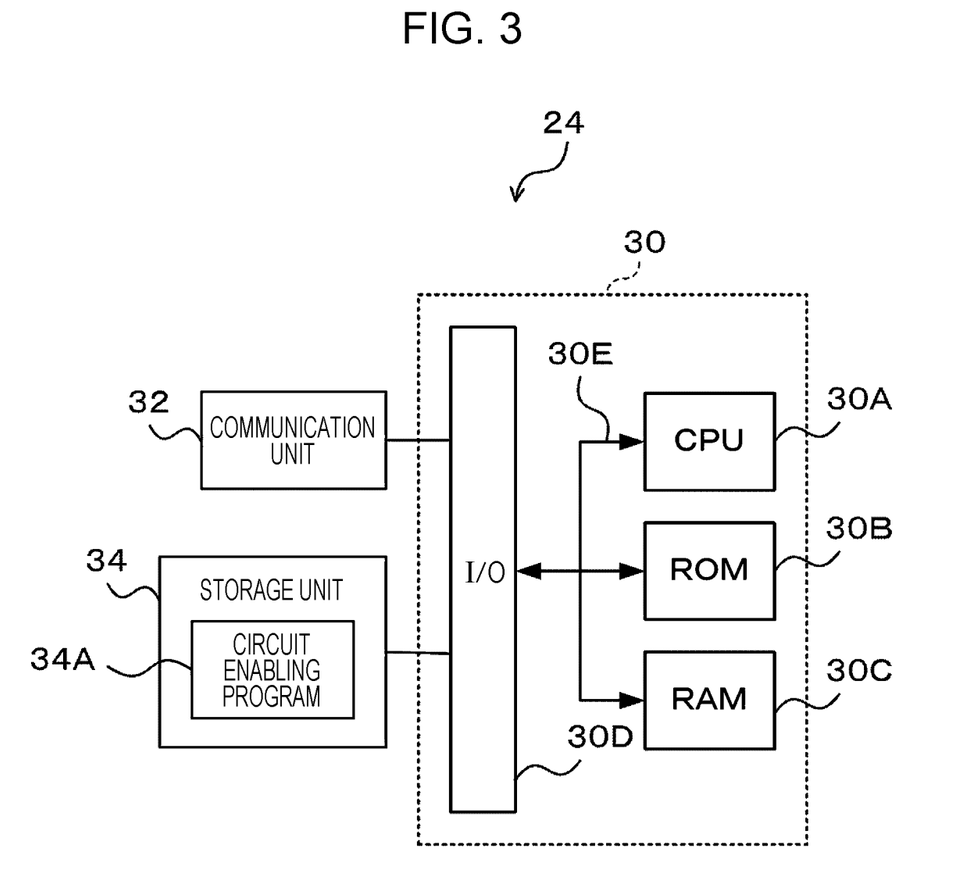
FIG. 3 is a diagram illustrating the hardware configuration of an enabling determination unit.

The hardware configuration of the enabling determination unit 24 will be described. As illustrated in FIG. 3, the enabling determination unit 24 includes a controller 30. The controller 30 includes a central processing unit (CPU) 30A, a read only memory (ROM) 30B, a random access memory (RAM) 30C, and an input/output interface (I/O) 30D. The CPU 30A, the ROM 30B, the RAM 30C, and the I/O 30D are connected to each other through a system bus 30E. The system bus 30E includes a control bus, an address bus, and a data bus. The CPU 30A is an exemplary processor.

The I/O 30D is connected to a communication unit 32 and a storage unit 34.

The communication unit 32 is an interface for performing data communication with the user register unit 22 and the modules A, B, and C.

The storage unit 34 is constituted, for example, by a nonvolatile memory, and stores, for example, a circuit enabling program 34A described below. The CPU 30A loads the circuit enabling program 34A, which is stored in the storage unit 34, to the RAM 30C for execution.

Figure 4:
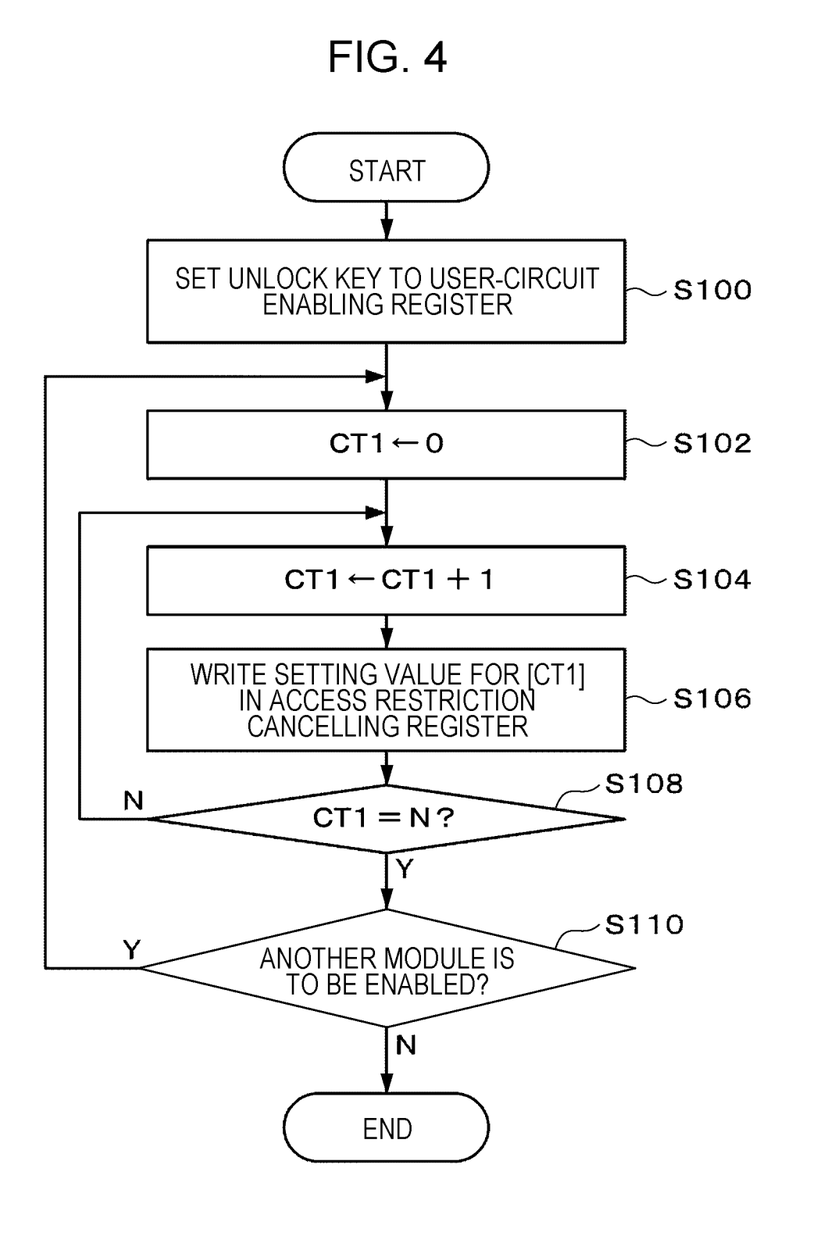
FIG. 4 is a flowchart of a process performed by a control unit.

A module enabling process, which is performed when the control unit 18 is to enable a module, will be described by referring to the flowchart in FIG. 4. The process in FIG. 4 is performed when setting values, whose number is N, for enabling a module are received from an external apparatus (not illustrated).

In step S100, the control unit 18 writes, in the user-circuit enabling register 20, an unlock key for enabling the user circuit. Thus, the user circuit 14 is allowed to be accessed, and setting values are allowed to be written in the access restriction cancelling register 26.

In step S102, the control unit 18 initializes a counter CT1 for counting the number of operations of writing a setting value in the access restriction cancelling register 26. That is, "0" is substituted into the counter CT1.

In step S104, the control unit 18 increments the counter CT1 by one.

In step S106, the control unit 18 writes a setting value for [CT1], which is received from the external apparatus, in the access restriction cancelling register 26. Herein, [CT1] represents the value of the counter CT1. For example, when the external apparatus is to enable the module A, the external apparatus needs to write setting value 1 for A, setting value 2 for A, and setting value 3 for A in this sequence in the access restriction cancelling register 26.

In step S108, the control unit 18 determines whether the counter CT1 is equal to N. In the present exemplary embodiment, for example, when N=3, the control unit 18 determines whether the counter CT1 is equal to three. That is, the control unit 18 determines whether three setting values have been written in the access restriction cancelling register 26 after initialization of the counter CT1.

If the determination result in step S108 is positive, the process proceeds to step S110. In contrast, if the determination result in step S108 is negative, the process proceeds to step S104. Thus, steps S104 to S108 are repeatedly performed until setting values, whose number is N, have been written in the access restriction cancelling register 26.

In step S110, the control unit 18 determines whether the external apparatus has transmitted an instruction to enable another module. If the determination result in step S110 is positive, the process proceeds to step S102, and substantially the same processes described above are performed repeatedly. In contrast, if the determination result in step S110 is negative, the routine ends.

Figure 5:
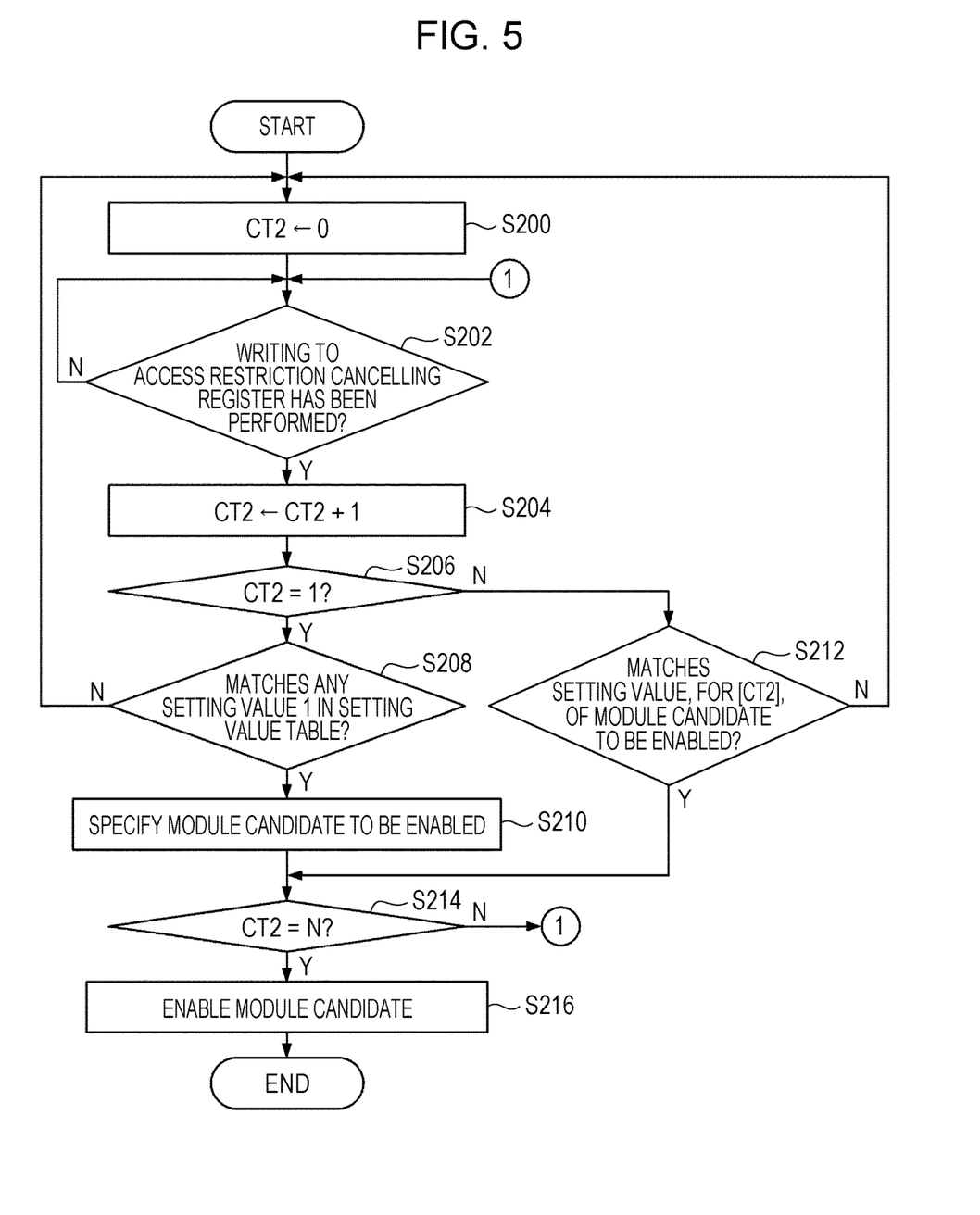
FIG. 5 is a flowchart of a process performed by an enabling determination unit.

A circuit enabling process performed by the CPU 30A of the enabling determination unit 24 will be described by referring to the flowchart in FIG. 5. The circuit enabling process in FIG. 5 is performed by the CPU 30A reading the circuit enabling program 34A stored in the storage unit 34. The process in FIG. 5 is performed repeatedly.

In step S200, the CPU 30A initializes a counter CT2 for counting the number of operations of writing a setting value in the access restriction cancelling register 26. That is, "0" is substituted into the counter CT2.

In step S202, the CPU 30A determines whether writing in the access restriction cancelling register 26 has been performed. If the determination result in step S202 is positive, the process proceeds to step S204. In contrast, if the determination result in step S202 is negative, the process waits until writing in the access restriction cancelling register 26 is performed.

In step S204, the CPU 30A increments the counter CT2 by one.

In step S206, the CPU 30A determines whether the counter CT2 is equal to "1". That is, the CPU 30A determines whether a value has been written in the access restriction cancelling register 26 for the first time after initialization of the counter CT2. If the determination result in step S206 is positive, the process proceeds to step S208.

In step S208, the CPU 30A determines whether the value written in the access restriction cancelling register 26 matches any of the setting values 1 of the modules, which are set in the setting value table 28. If the determination result in step S208 is positive, the process proceeds to step S210. In contrast, if the determination result in step S208 is negative, the process proceeds to step S200, and the routine is performed from the beginning.

In step S210, the CPU 30A specifies a module candidate that is to be enabled. For example, when the value written in the access restriction cancelling register 26 matches setting value 1 for A in the setting value table 28, the CPU 30A specifies the module A as a candidate that is to be enabled.

In contrast, if the determination result in step S206 is negative, that is, if the counter CT2 is equal to or higher than two, the process proceeds to step S212.

In step S212, the CPU 30A determines whether the value written in the access restriction cancelling register 26 matches the setting value, for [CT2], of the module candidate which is to be enabled and which is specified in step S210. Herein, [CT2] represents the value of the counter CT2.

Specifically, for example, if the module A is specified as the module candidate, which is to be enabled, in step S210 and if CT2=2, the CPU 30A determines whether the value written in the access restriction cancelling register 26 matches setting value 2 for A in the setting value table 28.

If the determination result in step S212 is positive, the process proceeds to step S214. In contrast, if the determination result in step S212 is negative, the process proceeds to step S200, and the routine is performed from the beginning.

In step S214, the CPU 30A determines whether CT2=N. That is, the CPU 30A determines whether the number of operations of writing a value in the access restriction cancelling register 26 reaches N. If the determination result in step 214 is positive, the process proceeds to step S216. In contrast, if the determination result in step 214 is negative, the process proceeds to step S202, and the process waits until a value is written in the access restriction cancelling register 26.

In step S216, the CPU 30A enables the module candidate which is to be enabled and which is specified in step S210. Thus, access to the enabled module and the register group of the module is allowed.

Thus, in the present exemplary embodiment, setting values necessary to enable each module are set for the module, allowing some of the modules to be enabled.

When a module is to be enabled, setting values, whose number is equal to N and which are set for the module which is to be enabled, need to be written in the access restriction cancelling register 26 in the predetermined order. That is, among the setting values whose number is equal to N, even if one wrong setting value is set, or if setting values are set in a wrong order, the module is not allowed to be enabled. Thus, unauthorized access to the module is restricted.

After a module is enabled, access to the register group for the enabled module and the module from the external apparatus is allowed until the module is disabled.

However, in access to a module from an external apparatus, the addresses of all the areas of the module are sometimes not to be open to the external apparatus.

Accordingly, the starting address of the module is open to the external apparatus. When data is written in the enabled module sequentially, the data may be written by incrementing the address starting from the starting address of the module.

For example, assume that, in normal writing, data 1 is written at an address, 0x1000, of the module A; data 2 is written at an address, 0x1004; data 3 is written at an address, 0x1008. In this case, the starting address, 0x1000, of the module A is open. After data 1 is written at the address, 0x1000, of the module A, the address, 0x1000, is incremented, and data 2 is written at the address, 0x1004; the address, 0x1004, is incremented and data 3 is written at the address, 0x1008. Thus, just the starting address of a module is open, suppressing unauthorized access to the module.

When modules are enabled successively, after setting for an enabled module is completed, enabling the next module may start. Specifically, assume the case in which the modules A and B are enabled successively. In this case, the module A is enabled by using the process in FIG. 5. Then, only after setting for the module A is made in the register group 27A, the module B is enabled.

In the present exemplary embodiment, the case in which the number of access restriction cancelling registers 26 is one is described. However, multiple access restriction cancelling registers may be included. When multiple setting values are written in the predetermined order in the multiple access restriction cancelling registers, a module corresponding to the setting values and the predetermined order may be enabled. Specifically, for example, when N=3, access restriction cancelling registers 26-1, 26-2, and 26-3 are included. When the module A is to be enabled, setting value 1 for A is written in the access restriction cancelling register 26-1; setting value 2 for A is written in the access restriction cancelling register 26-2; setting value 3 for A is written in the access restriction cancelling register 26-3. In this case, the module A is enabled. Thus, unauthorized access to a module is further restricted.

The flow of the process of the circuit enabling program 34A (see FIG. 5), which is described in the exemplary embodiments, is exemplary. Needless to say, unnecessary steps may be deleted, new steps may be added, and the process order may be switched without departing from the gist of the present disclosure.

The configuration of the user-specific circuit 10 (see FIG. 1) is also exemplary. Needless to say, unnecessary components may be deleted, and new components may be added without departing from the gist of the present disclosure.

In the present exemplary embodiment, the form in which the circuit enabling program 34A is installed in the storage unit 34 is described. However, the form is not limited to this. The information processing program according to the present exemplary embodiment may be provided in the form in which the information processing program is recorded in a computer-readable storage medium. For example, the information processing program according to the present exemplary embodiment may be provided in the form in which the information processing program is recorded in an optical disk, such as a compact disc (CD)-ROM or a digital versatile disc (DVD)-ROM, or in the form in which the information processing program is recorded in a semiconductor memory, such as a Universal Serial Bus (USB) memory or a memory card. The circuit enabling program 34A according to the present exemplary embodiment may be obtained from an external apparatus through a communication line connected to the communication unit 32.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A circuit enabling device comprising:
 a processor and a memory configured to:
  when a plurality of predetermined setting values are written in a register in predetermined order, enable a module corresponding to the plurality of predetermined setting values and the predetermined order based on a setting value table, the plurality of predetermined setting values being determined in advance for each of a plurality of modules, the register being used to enable the plurality of modules individually, the plurality of modules being included in a user-specific circuit, the user-specific circuit including a general-purpose circuit and a user circuit, the user circuit including the plurality of modules,
  wherein the module corresponding to the plurality of predetermined setting values and the predetermined order is enabled when the setting value table has a module which matches the predetermined order and the plurality of predetermined setting values and the module corresponding to the plurality of predetermined setting values and the predetermined order is not enabled when the setting value table does not have a module which matches the predetermined order and the plurality of predetermined setting values.

2. The circuit enabling device according to claim 1, wherein a starting address of the enabled module is open, and
 wherein the processor is configured to:
  in writing data in the enabled module sequentially, the data is written by incrementing an address starting from the starting address.

3. The circuit enabling device according to claim 2, wherein the processor is configured to:
  when the plurality of setting values are written in the predetermined order in a plurality of registers, enable a module corresponding to the plurality of setting values and the predetermined order.

4. The circuit enabling device according to claim 3, wherein the processor is configured to:
  when the plurality of modules are to be enabled successively, start enabling a next module after completion of setting of the enabled module.

5. The circuit enabling device according to claim 2, wherein the processor is configured to:
  when the plurality of modules are to be enabled successively, start enabling a next module after completion of setting of the enabled module.

6. The circuit enabling device according to claim 1, wherein the processor is configured to:
  when the plurality of setting values are written in the predetermined order in a plurality of registers, enable a module corresponding to the plurality of setting values and the predetermined order.

7. The circuit enabling device according to claim 6, wherein the processor is configured to:
  when the plurality of modules are to be enabled successively, start enabling a next module after completion of setting of the enabled module.

8. The circuit enabling device according to claim 1, wherein the processor is configured to:
  when the plurality of modules are to be enabled successively, start enabling a next module after completion of setting of the enabled module.

9. A non-transitory computer readable medium storing a program causing a computer to execute a process for enabling a module, the process comprising:
  when a plurality of predetermined setting values are written in a register in predetermined order, enabling a module corresponding to the plurality of predetermined setting values and the predetermined order based on a setting value table, the plurality of predetermined setting values being determined in advance for each of a plurality of modules, the register being used to enable the plurality of modules individually, the plurality of modules being included in a user-specific circuit, the user-specific circuit including a general-purpose circuit and a user circuit, the user circuit including the plurality of modules,
  wherein the module corresponding to the plurality of predetermined setting values and the predetermined order is enabled when the setting value table has a module which matches the predetermined order and the plurality of predetermined setting values and the module corresponding to the plurality of predetermined setting values and the predetermined order is not enabled when the setting value table does not have a module which matches the predetermined order and the plurality of predetermined setting values.

10. A user-specific circuit comprising:
 a general-purpose circuit; and
 a user circuit including:
  a plurality of modules,
  a register that is used to enable the plurality of modules individually, and
  an enabling determination unit comprising a memory and that, when a plurality of predetermined setting values are written in the register in predetermined order, enables a module corresponding to the plurality of predetermined setting values and the predetermined order based on a setting value table, the plurality of predetermined setting values being determined in advance for each of the plurality of modules, wherein the module corresponding to the plurality of predetermined setting values and the predetermined order is enabled when the setting value table has a module which matches the predetermined order and the plurality of predetermined setting values and the module corresponding to the plurality of predetermined setting values and the predetermined order is not enabled when the setting value table does not have a module which matches the predetermined order and the plurality of predetermined setting values.

* * * * *